C. O. Luce's Horse-Hay-Rake.

73820

PATENTED
JAN 28 1868

Witnesses:
Theo Tasche
W. Trewin

Inventor:
C. O. Luce
Per Munn
Attorneys

UNITED STATES PATENT OFFICE.

C. O. LUCE, OF BRANDON, VERMONT.

IMPROVEMENT IN HORSE-RAKES.

Specification forming part of Letters Patent No. 73,820, dated January 28, 1868.

*To all whom it may concern:*

Be it known that I, C. O. LUCE, of Brandon, in the county of Rutland and State of Vermont, have invented a new and useful Improvement in Horse Hay-Rakes; and I do hereby declare that the following is a full, clear, and exact description thereof, which will enable those skilled in the art to make and use the same, reference being had to the accompanying drawings, forming part of this specification, in which—

Figure 1:
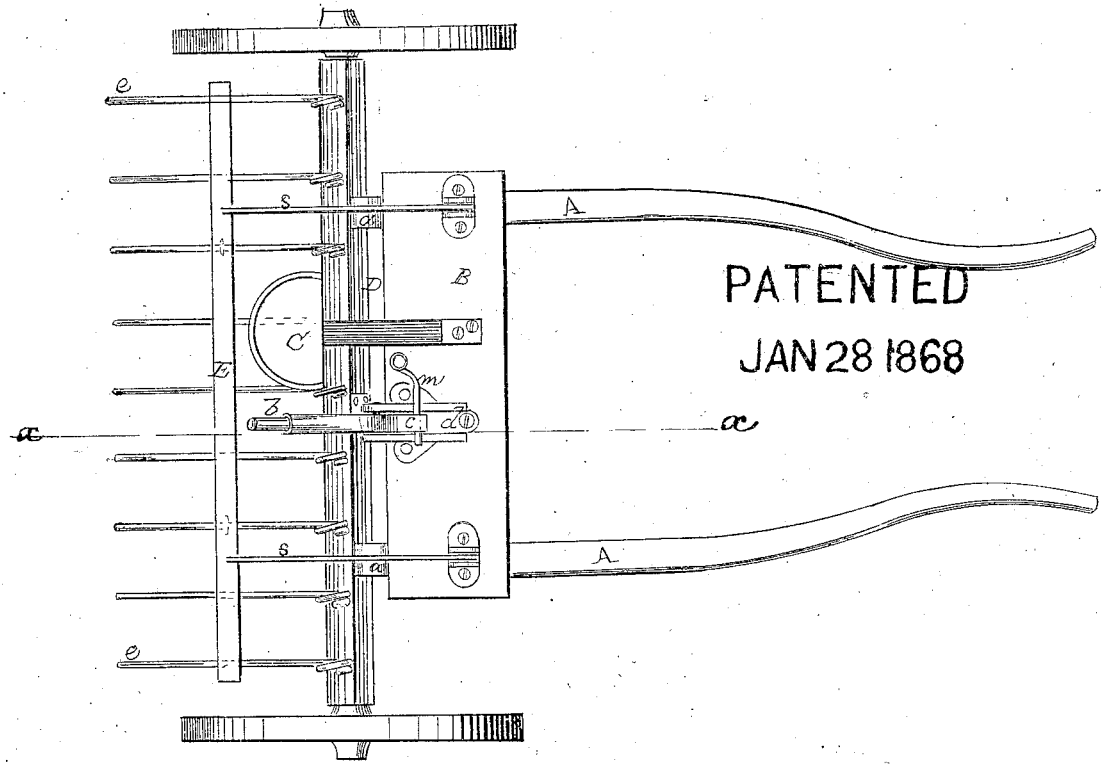
Figure 2:
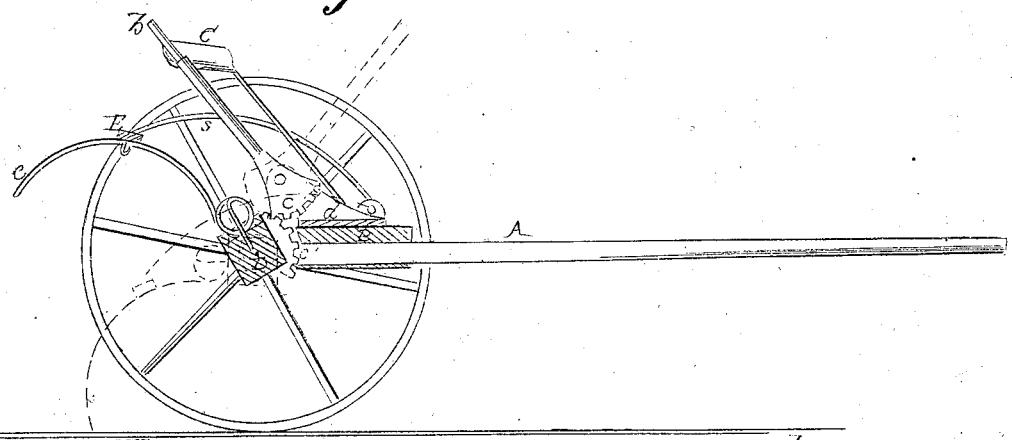

Figure 1 represents a top view of my improved hay-rake. Fig. 2 represents a vertical section taken in the line $x$ $x$, Fig. 1.

Similar letters of reference indicate corresponding parts.

This invention relates to an improvement in the construction and arrangement of a sulky horse hay-rake; and consists in attaching curved metal rake-teeth to the axle instead of an independent cross-head, and connecting the thills to the axle by straps or otherwise, so that the axle can turn freely independently, instead of being rigidly connected with the thills; and, further, in a segmental-gear connection between the axle and the thills, by which, at the pleasure of the driver, the rake-teeth may be raised and lowered, while also a clearer-rod is worked by the same movement, as hereinafter more particularly described.

A A are thills, united by a foot-board, B, on which is mounted the driver's seat C. The thills are connected with the axle D by straps $a$ $a$, or any other connection allowing the axle to oscillate or turn partly around independently. A lever, $b$, has a segment-rack, $c$, at one end, pivoted in a standard-block, $d$, secured to the foot-board B, which segment-rack works in a rack $c'$, on the axle D, to elevate or depress the curved rake-teeth $e$ $e$, which are fastened to the axle. A clearer-rod, E, extends across the back of the rake-teeth, and is connected by curved rods $s$ $s$ with the foot-board B, so that when the axle is turned to raise the rake-teeth from the ground by the segment-rack the rod E will clear them of the load of hay. A catch-rod, $m$, is provided to hold the segment-rack and keep the rake-teeth at any desired elevation.

Having described my invention, I claim as new and desire to secure by Letters Patent—

The oscillating axle D, connected with the thills by the straps $a$, segment-rack C on the lever $b$, foot-board B, segment-rack $c'$, and curved teeth $e$, in combination with the clearer-bar E, extending across the teeth $e$, and supported by the curved bars $s$ from the foot-board B, as herein described, for the purpose specified.

C. O. LUCE.

Witnesses:
JOSIAH J. HAWKINS,
WESLEY MORRILL.